United States Patent
Ishioka et al.

(10) Patent No.: US 11,130,490 B2
(45) Date of Patent: Sep. 28, 2021

(54) VEHICLE CONTROL DEVICE

(71) Applicant: HONDA MOTOR CO., LTD., Tokyo (JP)

(72) Inventors: Atsushi Ishioka, Wako (JP); Kanta Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 16/725,380

(22) Filed: Dec. 23, 2019

(65) Prior Publication Data
US 2020/0207344 A1    Jul. 2, 2020

(30) Foreign Application Priority Data

Dec. 26, 2018   (JP) .............................. JP2018-243087

(51) Int. Cl.
*B60W 30/14* (2006.01)
*B60W 40/04* (2006.01)

(52) U.S. Cl.
CPC .......... *B60W 30/143* (2013.01); *B60W 40/04* (2013.01); *B60W 2554/4042* (2020.02); *B60W 2554/80* (2020.02); *B60W 2720/106* (2013.01); *B60W 2754/50* (2020.02)

(58) Field of Classification Search
CPC ............... B60W 30/143; B60W 40/04; B60W 2754/50; B60W 2554/4042; B60W 2554/80; B60W 2720/106
See application file for complete search history.

(56) References Cited

U.S. PATENT DOCUMENTS

| | | | |
|---|---|---|---|
| 10,371,811 B2 | 8/2019 | Shokonji | |
| 2015/0307097 A1* | 10/2015 | Steinmeyer | B60W 30/14 701/70 |
| 2017/0361841 A1* | 12/2017 | Kojo | B60W 30/0956 |
| 2018/0038952 A1* | 2/2018 | Shokonji | G01S 15/86 |
| 2018/0137762 A1* | 5/2018 | Lee | B60W 50/14 |
| 2018/0148054 A1 | 5/2018 | Urano et al. | |
| 2018/0222480 A1* | 8/2018 | Shokonji | B60W 50/14 |
| 2019/0135282 A1* | 5/2019 | Sakaguchi | B60W 30/18027 |
| 2019/0210600 A1* | 7/2019 | Etori | B60W 50/10 |

(Continued)

FOREIGN PATENT DOCUMENTS

| | | | |
|---|---|---|---|
| JP | 2001-076299 A | 3/2001 | |
| JP | 2002-329298 A | 11/2002 | |

(Continued)

OTHER PUBLICATIONS

Office Action dated Aug. 4, 2020 issued over the corresponding Japanese Patent Application No. 2018-243087 with the English translation thereof.

*Primary Examiner* — Peter D Nolan
*Assistant Examiner* — Mikko Okechukwu Obioha
(74) *Attorney, Agent, or Firm* — Carrier Blackman & Associates, P.C.; Joseph P. Carrier; Fulchand P. Shende

(57) ABSTRACT

After stop control and before start control, if a situation monitoring unit does not detect predetermined change of a peripheral situation or a host vehicle situation, a travel control unit performs the start control at the normal control amount, and if the situation monitoring unit detects the predetermined change of the peripheral situation or the host vehicle situation, the travel control unit performs the start control at the control amount that is suppressed compared with the normal control amount.

10 Claims, 6 Drawing Sheets

(56) References Cited

U.S. PATENT DOCUMENTS

| | | | | |
|---|---|---|---|---|
| 2019/0344791 A1* | 11/2019 | Kim | ................... | B60W 30/17 |
| 2020/0094831 A1* | 3/2020 | Kudo | ............... | B60W 50/0097 |
| 2020/0114911 A1* | 4/2020 | Mitsuhashi | ....... | B60W 60/0053 |
| 2020/0361463 A1* | 11/2020 | Hirano | ............... | B60W 30/143 |

FOREIGN PATENT DOCUMENTS

| | | |
|---|---|---|
| JP | 2018-020720 A | 2/2018 |
| JP | 2018-086874 A | 6/2018 |
| JP | 2018-086958 A | 6/2018 |

\* cited by examiner

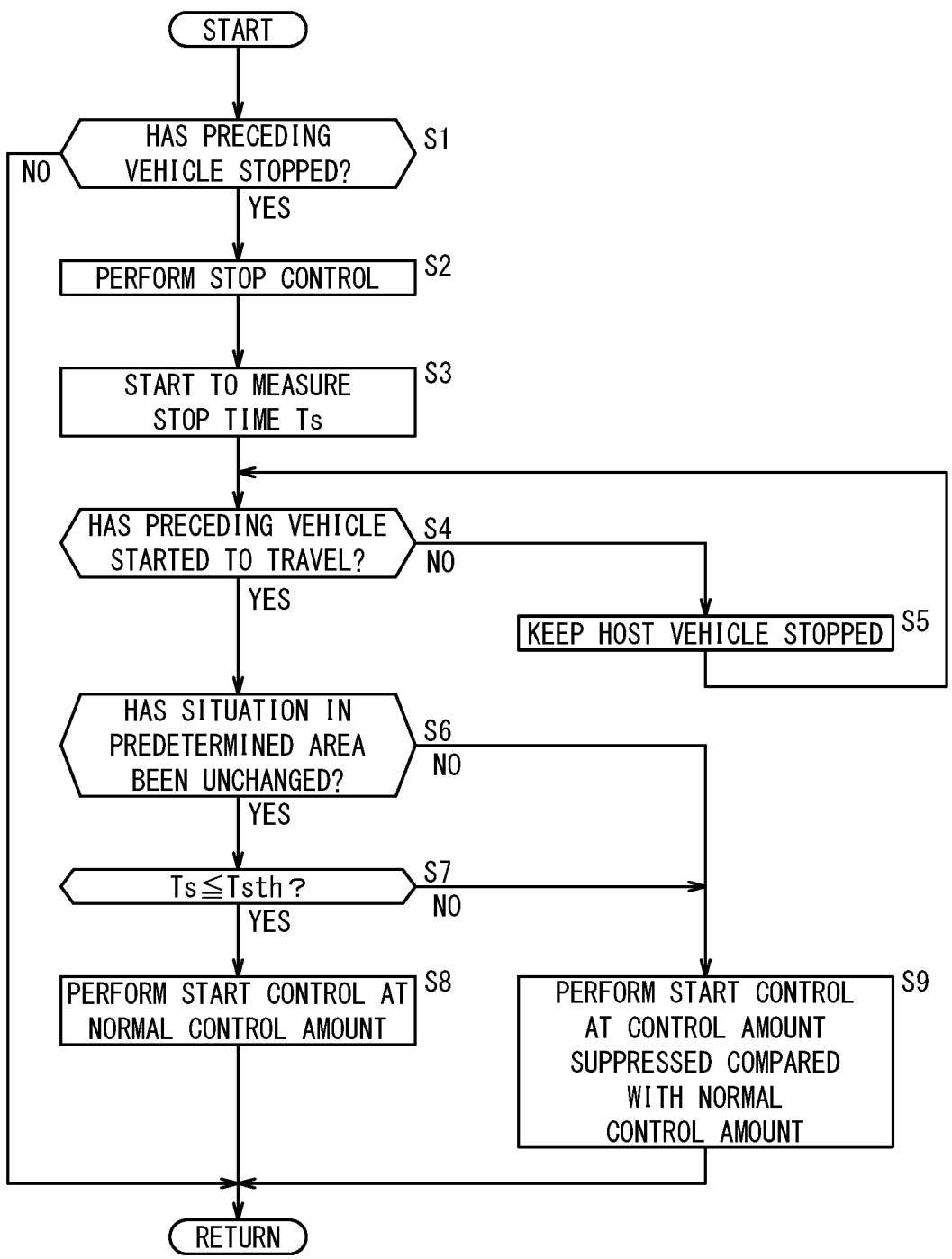

VEHICLE CONTROL DEVICE

CROSS-REFERENCE TO RELATED APPLICATION

This application is based upon and claims the benefit of priority from Japanese Patent Application No. 2018-243087 filed on Dec. 26, 2018, the contents of which are incorporated herein by reference.

BACKGROUND OF THE INVENTION

Field of the Invention

The present invention relates to a vehicle control device that performs driving operation of a host vehicle partially or entirely on the basis of a control state that is set.

Description of the Related Art

A vehicle control device that performs driving operation of a host vehicle partially or entirely on the basis of a controls state that is set has been recently developed. Japanese Laid-Open Patent Publication No. 2018-086874 discloses a device that stops a host vehicle in accordance with the stop of a preceding vehicle, and causes the host vehicle to start to travel automatically in accordance with the start of the preceding vehicle. In this device, automated travel start permission time when the host vehicle starts to travel automatically in accordance with the start of the preceding vehicle is set in accordance with a travel environment. This device can reduce the frequency of start operation by a driver.

SUMMARY OF THE INVENTION

In order to cause the host vehicle to start to travel, it is appropriate to perform start control depending on whether there is a difference between a situation where the host vehicle is stopped and a situation where the host vehicle starts to travel, or the degree of the difference.

The present invention has been made in view of the above circumstances, and an object is to provide a vehicle control device that can perform start control of a host vehicle optimally in accordance with a difference between a situation where the host vehicle is stopped and a situation where the host vehicle starts to travel.

An aspect of the present invention is a vehicle control device including: a preceding vehicle recognition unit configured to recognize a preceding vehicle ahead of a host vehicle and behavior of the preceding vehicle; a travel control unit configured to, if the preceding vehicle recognition unit detects that the preceding vehicle stops, perform stop control of the host vehicle, and if the preceding vehicle recognition unit detects that the preceding vehicle starts to travel, perform start control of the host vehicle; and a situation monitoring unit configured to monitor a peripheral situation expressing a situation around the host vehicle or a host vehicle situation expressing a situation of the host vehicle itself, wherein after the preceding vehicle stops and before the host vehicle starts to travel, if the situation monitoring unit does not detect a predetermined change of the peripheral situation or the host vehicle situation, the travel control unit performs the start control at a normal control amount, and if the situation monitoring unit detects the predetermined change of the peripheral situation or the host vehicle situation, the travel control unit performs the start control at a control amount that is suppressed compared with the normal control amount or cancel the start control.

By the present invention, the start control of the host vehicle can be performed optimally.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a flowchart of a process performed in the vehicle control device;

DESCRIPTION OF THE PREFERRED EMBODIMENT

A preferred embodiment of a vehicle control device according to the present invention is hereinafter described in detail with reference to the attached drawings.

1. Overview of Vehicle Control Device 10

Figure 1:
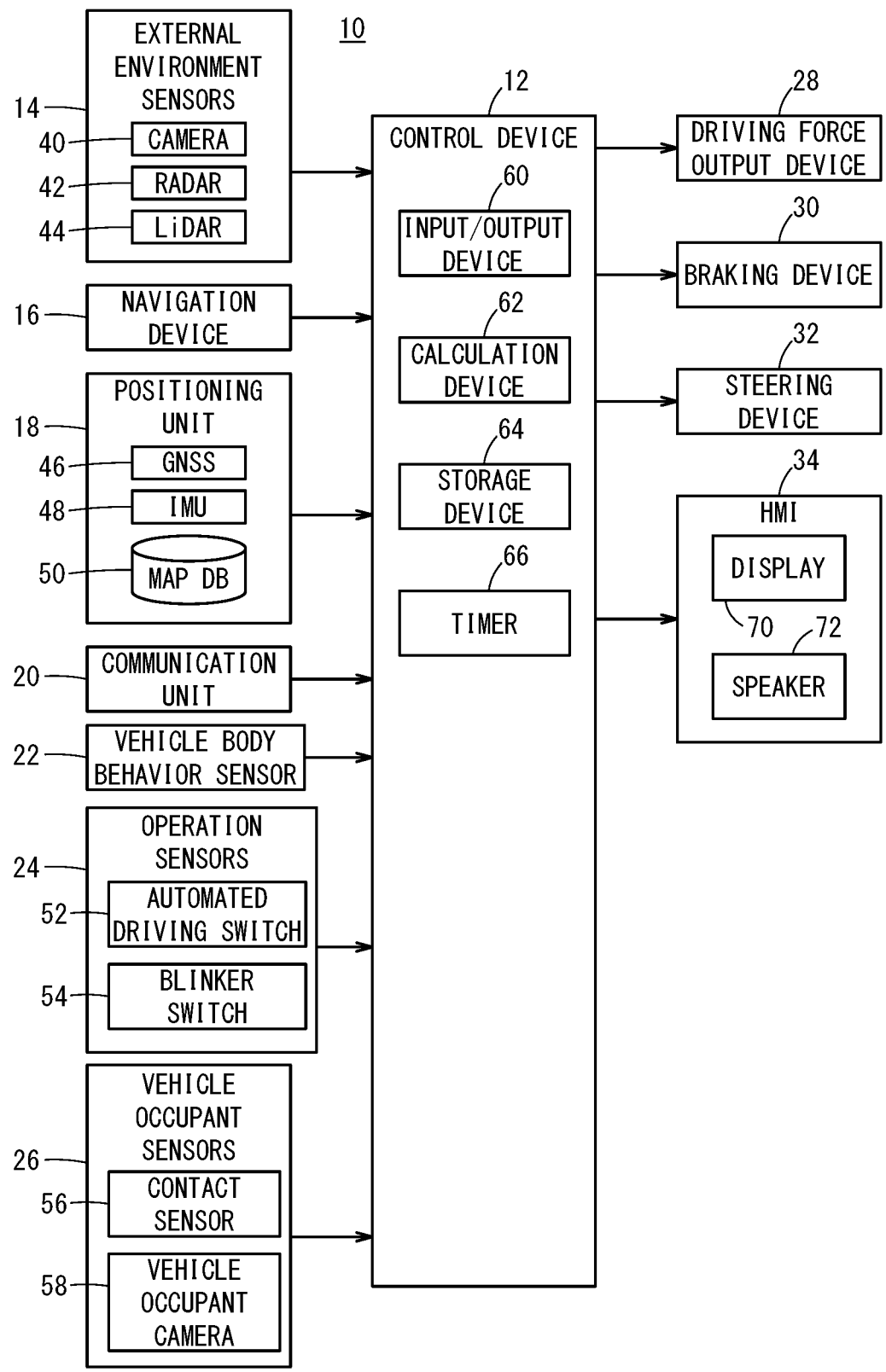
FIG. 1 is a block diagram of a vehicle control device according to a present embodiment.
Figure 3A:
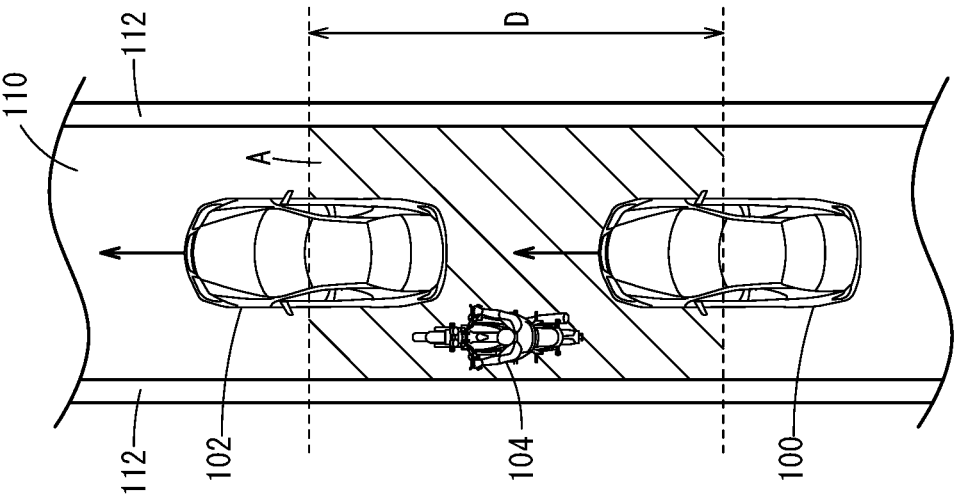
FIG. 3A is a state explanatory diagram describing a case where a host vehicle stops.
Figure 3B:
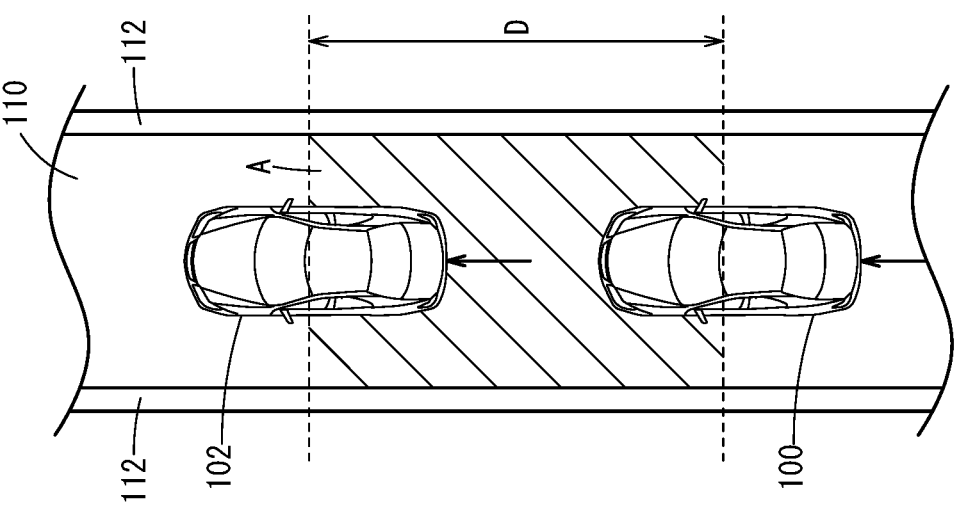
FIG. 3B is a state explanatory diagram describing a case where the host vehicle starts to travel.

A vehicle control device 10 illustrated in FIG. 1 can perform driving operation of a host vehicle 100 (FIG. 3A, FIG. 3B) partially or entirely on the basis of a control state that is set. The vehicle control device 10 can automatically perform a series of control including at least stop control when a preceding vehicle 102 stops (FIG. 3A), stop keeping control after stopping, and start control when the preceding vehicle 102 starts to travel (FIG. 3B). The vehicle control device 10 performs the stop control, the stop keeping control, and the start control in a case where the host vehicle 100 follows the preceding vehicle 102 (FIG. 3A, FIG. 3B) in a traffic jam, that is, the start and the stop are repeated in a short period, for example.

2. Configuration of Vehicle Control Device 10

A configuration of the vehicle control device 10 is described with reference to FIG. 1. The vehicle control device 10 includes a control device 12, an input device group that inputs various pieces of information to the control device 12, and an output device group that operates the host vehicle 100 on the basis of the various pieces of information output from the control device 12. The input device group includes external environment sensors 14, a navigation device 16, a positioning unit 18, a communication unit 20, a vehicle body behavior sensor 22, operation sensors 24, and vehicle occupant sensors 26. The output device group includes a driving force output device 28, a braking device 30, a steering device 32, and an HMI 34.

[2.1 Configuration of Input Device Group]

The external environment sensors 14 include one or more cameras 40, one or more radars 42, and one or more LiDARs 44. The camera 40 photographs a peripheral environment of the host vehicle 100, and outputs image information to the control device 12. The radar 42 and the LiDAR 44 detect a target around the host vehicle 100, and output detection information to the control device 12. The navigation device 16 specifies the position of the host vehicle 100 by GPS or the like, generates a travel route from the position of the host vehicle 100 to a destination designated by a vehicle occupant, and outputs travel route information to the control device 12. The positioning unit 18 outputs to the control device 12, positional information that expresses the position of the host vehicle 100 specified by a GNSS 46 and an IMU 48, and map information that is stored in a map DB 50. Note that the map information in the map DB 50 has higher accuracy than that of map information in the navigation device 16, and includes various pieces of information (for example, information in each lane) that are not included in the map information in the navigation device 16. The communication unit 20 includes a communication device that receives information broadcasted by a broadcasting station, a communication device that receives information transmitted by a road-side machine that is disposed on a road, and a communication device that receives information transmitted by vehicles other than the host vehicle. The communication unit 20 outputs the received various pieces of information to the control device 12.

The vehicle body behavior sensor 22 includes various sensors that measure behavior of the host vehicle 100 (a vehicle speed, a yaw rate, or the like). The vehicle body behavior sensor 22 outputs measured various pieces of information to the control device 12. The operation sensors 24 include an automated driving switch 52, a blinker switch (turn signal switch) 54, and various sensors (not shown) that measure the operation amount of operation elements (an accelerator pedal, a brake pedal, and a steering wheel). The automated driving switch 52 outputs to the control device 12, instruction information in accordance with the vehicle occupant's operation of the switch. For example, this instruction information corresponds to instruction information that executes/stops automated driving, or instruction information that instructs the control state of the host vehicle 100 in the automated driving (see [2.2] below). The blinker switch 54 outputs to the control device 12, information in accordance with operation of a blinker lever. The information in accordance with the operation of the blinker lever corresponds to information that expresses the vehicle occupant's will regarding the movement of the host vehicle 100 in a lateral direction (execute the turning movement or cancel the movement). The vehicle occupant sensors 26 include a contact sensor 56 and a vehicle occupant camera 58. The contact sensor 56 is a capacitive sensor or a pressure sensor that is provided to the steering wheel. The contact sensor 56 detects a gripping state of the steering wheel by the vehicle occupant (contact state), and outputs detection information to the control device 12. The vehicle occupant camera 58 is provided so as to face a driver's seat. The vehicle occupant camera 58 photographs the vehicle occupant's head (face), and outputs image information to the control device 12.

[2.2 Control State of Host Vehicle 100 in Automated Driving]

Here, "the control state of the host vehicle 100 in the automated driving" instructed by the automated driving switch 52 is described. "The control state of the host vehicle 100 in the automated driving" is categorized in view of a plurality of states in accordance with the degree of the automation of the driving operation, in other words, in view of a plurality of control states in which the burden on the vehicle occupant is different. For example, the control state may be categorized in accordance with what is called an automated driving level, or a combination of the following states (1), (3), and (4) or a combination of the following states (2), (3), and (4).

(1) A state in which the vehicle control device 10 operates any one of the driving force output device 28, the braking device 30, and the steering device 32.

(2) A state in which the vehicle control device 10 operates two or more devices among the driving force output device 28, the braking device 30, and the steering device 32.

(3) A state in which gripping (contact of) the steering wheel is necessary or a state in which the gripping is unnecessary.

(4) A state in which monitoring the periphery by the vehicle occupant who is seated on the driver's seat is necessary or a state in which the monitoring is unnecessary.

[2.3 Configuration of Control Device 12]

The control device 12 is configured by an ECU. The control device 12 includes an input/output device 60, a calculation device 62, a storage device 64, and a timer 66. The input/output device 60 includes an A/D conversion circuit, a communication interface, a driver, or the like. The calculation device 62 includes a processor including a CPU or the like, for example. The calculation device 62 executes programs stored in the storage device 64, so that various functions are achieved. The various functions of the calculation device 62 are described in [2.5] below. The storage device 64 includes a RAM, a ROM, or the like. The storage device 64 stores various programs and numerical information such as a threshold that is used in a process performed by the calculation device 62. The timer 66 measures various kinds of time.

[2.4 Configuration of Output Device Group]

The driving force output device 28 includes a driving force output ECU and an actuator (including a traction motor, a throttle valve, or the like) to be controlled by the driving force output ECU. The driving force output device 28 adjusts driving force in accordance with the vehicle occupant's operation of the accelerator pedal or instruction information (driving instruction) that is output from the control device 12.

The braking device 30 includes a braking ECU and an actuator (including a brake actuator or the like) to be controlled by the braking ECU. The braking device 30 adjusts braking force in accordance with the vehicle occupant's operation of the brake pedal or instruction information (braking instruction) that is output from the control device 12.

The steering device 32 includes an electric power steering (EPS) ECU and an actuator (including an EPS actuator or the like) to be controlled by the EPS ECU. The steering device 32 adjusts the steering amount in accordance with the vehicle occupant's operation of the steering wheel or instruction information (steering instruction) that is output from the control device 12.

The HMI 34 includes a display 70 and a speaker 72. The display 70 outputs video information in accordance with instruction information (notification instruction) that is output from the control device 12. The speaker 72 outputs audio information in accordance with the instruction information (notification instruction) that is output from the control device 12.

[2.5 Various Functions of Calculation Device 62]

Figure 2:
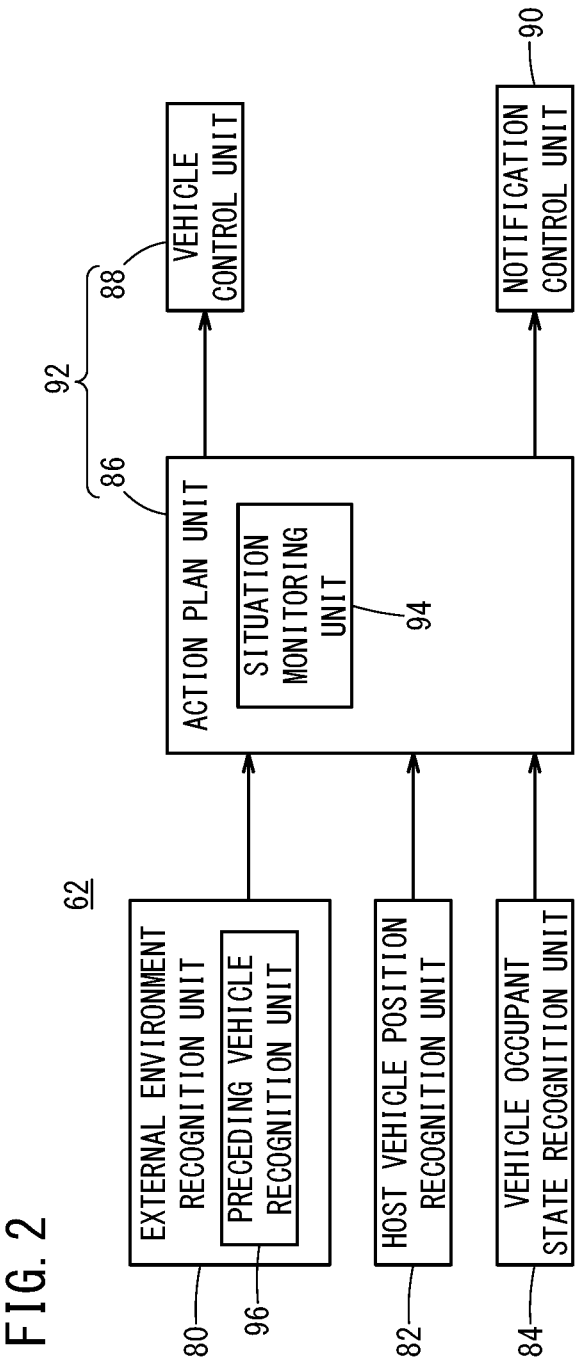
FIG. 2 is a function block diagram of a calculation device.

The various functions achieved by the calculation device 62 are described with reference to FIG. 2. The calculation device 62 functions as an external environment recognition unit 80, a host vehicle position recognition unit 82, a vehicle occupant state recognition unit 84, an action plan unit 86, a vehicle control unit 88, and a notification control unit 90. In the present embodiment, the action plan unit 86 and the vehicle control unit 88 are collectively referred to as a travel control unit 92.

The external environment recognition unit 80 recognizes a state around the host vehicle 100 on the basis of the image information and the detection information output from the external environment sensors 14. The external environment recognition unit 80 includes a preceding vehicle recognition unit 96 as a function that recognizes the preceding vehicle 102 (FIG. 3A, FIG. 3B) in front of the host vehicle 100. The preceding vehicle recognition unit 96 recognizes the preceding vehicle 102 and behavior of the preceding vehicle 102. The host vehicle position recognition unit 82 recognizes the position of the host vehicle 100 on the basis of the positional information and the map information output from the positioning unit 18. The vehicle occupant state recognition unit 84 recognizes the gripping state of the steering wheel by the vehicle occupant (whether the vehicle occupant is in contact with the steering wheel) on the basis of the detection information output from the contact sensor 56. In addition, the vehicle occupant state recognition unit 84 recognizes a peripheral monitoring state by the vehicle occupant (whether the vehicle occupant watches the front, or whether the vehicle occupant's eyes are open) on the basis of the image information output from the vehicle occupant camera 58.

The action plan unit 86 generates a local map (dynamic map) that includes static information and dynamic information around the host vehicle 100 on the basis of recognition result from the external environment recognition unit 80 and the host vehicle position recognition unit 82. Then, the action plan unit 86 decides the optimum action on the basis of the local map and the state of the host vehicle 100 (a vehicle speed, a steering angle, and a position), and calculates the travel speed (or an acceleration/deceleration) to perform the action and generates a travel trajectory.

The action plan unit 86 functions as a situation monitoring unit 94 that monitors a peripheral situation or a host vehicle situation. The peripheral situation is a situation around the host vehicle 100, and corresponds to, for example, stop time T of the preceding vehicle 102 or whether there is a target (other vehicle 104, an obstacle, or the like) that did not exist when the host vehicle 100 was stopped in a predetermined area A (FIG. 3A, FIG. 3B). The host vehicle situation is a situation of the host vehicle 100 itself, and corresponds to stop time T of the host vehicle 100.

The vehicle control unit 88 calculates the acceleration/deceleration in order to cause the host vehicle 100 to travel at the travel speed calculated by the action plan unit 86, and the steering angle in order to cause the host vehicle 100 to travel along the travel trajectory generated by the action plan unit 86. Note that if the action plan unit 86 calculates the acceleration/deceleration, the vehicle control unit 88 does not need to calculate the acceleration/deceleration. The vehicle control unit 88 outputs instruction information about the acceleration/deceleration and the steering angle to the driving force output device 28, the braking device 30, and the steering device 32 through the input/output device 60. If the notification is necessary in accordance with the action decided by the action plan unit 86, the notification control unit 90 outputs the instruction information expressing notification contents to the HMI 34 through the input/output device 60.

3. Process Performed in Vehicle Control Device 10

A process that is performed in the vehicle control device 10 is described with reference to FIG. 4. The process in FIG. 4 is performed at predetermined time intervals in a case where the control state in which the stop and the start of the host vehicle 100 are automatically performed is set by operating the automated driving switch 52. Moreover, in the process in FIG. 4, the input device group described in [2.1] acquires various pieces of information periodically. Furthermore, the external environment recognition unit 80, the host vehicle position recognition unit 82, and the vehicle occupant state recognition unit 84 perform the recognition process periodically.

In step S1, the action plan unit 86 determines whether the preceding vehicle 102 has stopped on the basis of a recognition result from the preceding vehicle recognition unit 96. If the preceding vehicle 102 has stopped (step S1: YES), that is, if the behavior of the preceding vehicle 102 has changed from a travelling state to a stopped state, the process advances to step S2. On the other hand, if the preceding vehicle 102 has not stopped (step S1: NO), that is, if the preceding vehicle 102 continues traveling, the process is terminated once.

In step S2, the action plan unit 86 generates the travel speed and the travel trajectory so as to perform the stop control. The vehicle control unit 88 outputs the instruction information in accordance with the stop control to the driving force output device 28, the braking device 30, and the steering device 32. After step S2, the process advances to step S3.

In step S3, the situation monitoring unit 94 starts to measure time by the timer 66, and measures stop time Ts. The start point of the stop time Ts is set between the stop of the preceding vehicle 102 and the stop of the host vehicle 100. Moreover, when the preceding vehicle 102 or the host vehicle 100 has stopped, the situation monitoring unit 94 stores in the storage device 64, a situation of the target (position of target) in the predetermined area A ahead of the host vehicle 100 as stop state information on the basis of the recognition result from the preceding vehicle recognition unit 96. For example, as illustrated in FIG. 3A, the predetermined area A ahead of the host vehicle 100 is the area that is inside a travel lane 110 of the host vehicle 100 (including a portion on a lane mark 112) and a forward area of the host vehicle 100 by a predetermined distance D from a reference position of the host vehicle 100 (central position in the vehicle longitudinal direction). After step S3, the process advances to step S4.

In step S4, the action plan unit 86 determines whether the preceding vehicle 102 has started to travel on the basis of the recognition result from the preceding vehicle recognition unit 96. If the preceding vehicle 102 has started to travel (step S4: YES), that is, if the behavior of the preceding vehicle 102 has changed from the stop to the travel, the process advances to step S6. On the other hand, if the preceding vehicle 102 has not started to travel (step S4: NO), that is, if the preceding vehicle 102 is kept stopped, the process advances to step S5.

In step S5, the action plan unit 86 determines that it is necessary to keep the host vehicle 100 stopped. The vehicle control unit 88 outputs the instruction information to the braking device 30. The braking device 30 operates to keep the braking. After step S5, the process returns to step S4.

In step S6, the situation monitoring unit 94 determines whether there has been no change in the predetermined area A. Here, the situation monitoring unit 94 determines the situation of the target (position of the target) in the predetermined area A on the basis of the recognition result from the preceding vehicle recognition unit 96, and compares the result with the stop state information stored in the storage device 64. Moreover, if both are the same (difference is less than a predetermined amount), the situation monitoring unit 94 determines that there is no change in the predetermined area A. On the other hand, if both are different (difference is more than or equal to the predetermined amount), the situation monitoring unit 94 determines that there is a change in the predetermined area A. For example, as illustrated in FIG. 3B, while the host vehicle 100 is stopped, the other vehicle 104 such as a motorcycle may pass by the host vehicle 100 and stop around the host vehicle 100. In this case, the situation monitoring unit 94 detects the other vehicle 104 that did not exist when the host vehicle 100 was stopped by comparing the stop state information and the latest recognition result, and determines that there is a change in the predetermined area A. If there is no change in the predetermined area A (step S6: YES), the process advances to step S7. On the other hand, if there is a change in the predetermined area A (step S6: NO), the process advances to step S9.

In step S7, the situation monitoring unit 94 determines whether the stop time Ts that is measured by the timer 66 is less than or equal to predetermined time Tsth. If Ts≤Tsth is satisfied (step S7: YES), the process advances to step S8. On the other hand, if Ts>Tsth is satisfied (step S7: NO), the process advances to step S9.

In step S8, the travel control unit 92 (action plan unit 86, vehicle control unit 88) outputs the instruction information to the driving force output device 28, the braking device 30, and the steering device 32 such that the start control is performed at a normal control amount (see [4] below). The driving force output device 28 performs acceleration operation, and the braking device 30 performs brake cancel operation. The situation monitoring unit 94 resets the timer 66.

In step S9, the travel control unit 92 (action plan unit 86, vehicle control unit 88) outputs the instruction information to the driving force output device 28, the braking device 30, and the steering device 32 such that the start control is performed at a control amount that is suppressed compared with the normal control amount (see [4] below). The driving force output device 28 performs the acceleration operation, and the braking device 30 performs the brake cancel operation. The situation monitoring unit 94 resets the timer 66.

4. Start Control

The start control that is performed in step S8 and step S9 in FIG. 4 is described. The travel control unit 92 changes the control amount in the start control between step S8 and step S9. The control amount refers to a control amount that is adjusted when the host vehicle 100 starts to travel. In the present embodiment, the control amount corresponds to one or both of an acceleration ax and a start timing (delay time t after the preceding vehicle 102 starts to travel and until the host vehicle 100 starts to travel).

4.1 First Example

Figure 5A:
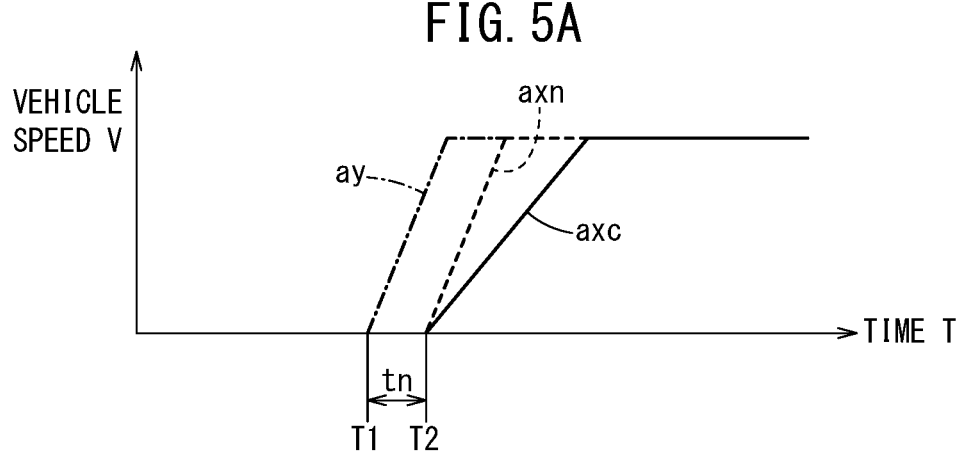
FIGS. 5A, 5B, and 5C are explanatory diagrams for describing start control that is performed at the normal control amount and the start control that is performed at the suppressed control amount.

The start control in a first example is described with reference to FIG. 5A. In the first example, the control amount is the acceleration ax of the host vehicle 100. The acceleration ax of the host vehicle 100 is hereinafter categorized into normal acceleration axn and suppressed acceleration axc. The acceleration axc is suppressed compared with the normal acceleration axn, that is, axc<axn is satisfied.

It is assumed that the preceding vehicle 102 has started to travel at an acceleration ay at a time point T1. The preceding vehicle recognition unit 96 recognizes the start behavior of the preceding vehicle 102 and the acceleration ay of the preceding vehicle 102.

In step S8 in FIG. 4, the travel control unit 92 acquires the acceleration axn by using a first acceleration table (not shown) that is stored in the storage device 64. In the first acceleration table, the normal acceleration axn is set corresponding to the acceleration ay of the preceding vehicle 102. The acceleration axn is set so as to be less than or equal to the acceleration ay of the preceding vehicle 102. Moreover, the travel control unit 92 reads out a normal delay time tn from the storage device 64. Then, the travel control unit 92 controls the driving force output device 28 and the braking device 30 such that the host vehicle 100 starts to travel at the normal acceleration axn at a normal timing, that is, at a time point T2 when the delay time tn has elapsed after the time point T1.

On the other hand, in step S9 in FIG. 4, the travel control unit 92 acquires the acceleration axc by using a second acceleration table (not shown) that is stored in the storage device 64. In the second acceleration table, the acceleration axc is set corresponding to the acceleration ay of the preceding vehicle 102. The acceleration axc is set so as to be less than the acceleration ay of the preceding vehicle 102. Moreover, the travel control unit 92 reads out the normal delay time tn that is stored in the storage device 64. Then, the travel control unit 92 controls the driving force output device 28 and the braking device 30 such that the host vehicle 100 starts to travel at the suppressed acceleration axc at the normal timing, that is, at the time point T2 when the delay time tn has elapsed after the time point T1.

4.2 Second Example

Figure 5B:
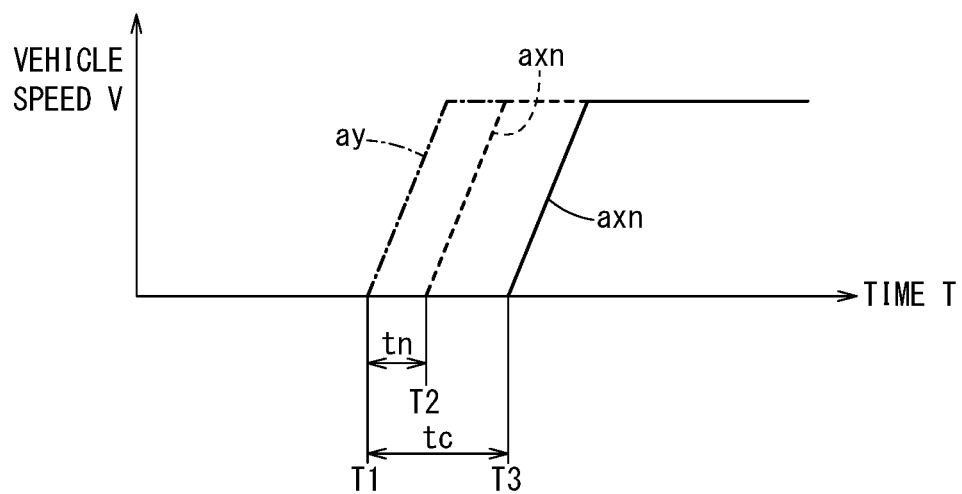

The start control in a second example is described with reference to FIG. 5B. In the second example, the control amount is the start timing (delay time t) of the host vehicle 100. Note that in the second example, a process that is performed in step S8 in FIG. 4 is the same as that in the first example. Thus, the description thereof is omitted.

In step S9 in FIG. 4, the travel control unit 92 acquires the acceleration axn (≤ay) by using the first acceleration table that is described in the first example. Moreover, the travel control unit 92 reads out delay time tc that is stored in the storage device 64. The delay time tc is suppressed compared with the normal delay time tn, that is, tc>tn is satisfied. Then, the travel control unit 92 controls the driving force output device 28 and the braking device 30 such that the host vehicle 100 starts to travel at the normal acceleration axn at a timing after the normal timing, that is, at a time point T3 when the delay time tc has elapsed after the time point T1.

4.3 Third Example

Figure 5C:
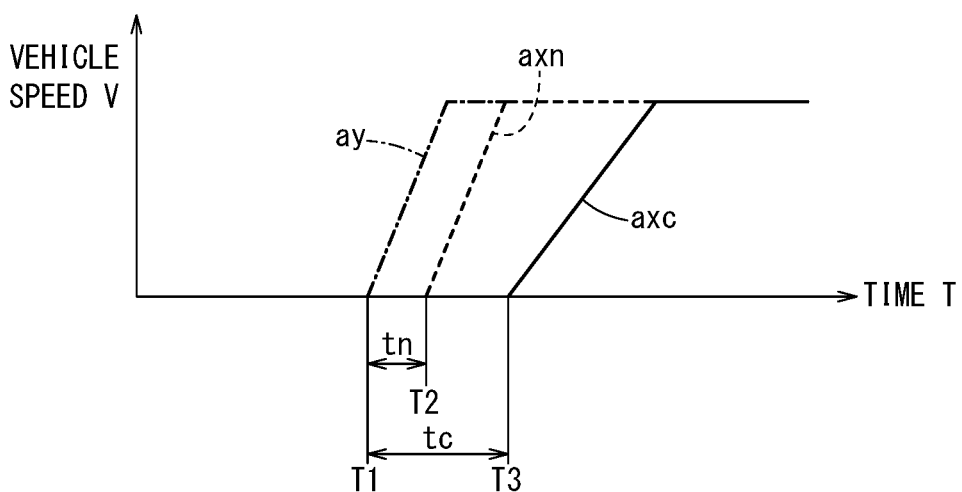

The start control in a third example is described with reference to FIG. 5C. In the third example, the control amount is the acceleration ax and the start timing (delay time t) of the host vehicle 100. Note that in the third example, a process that is performed in step S8 in FIG. 4 is the same as that in the first example. Thus, the description thereof is omitted.

In step S9 in FIG. 4, the travel control unit 92 acquires the acceleration axc (<ay) by using the second acceleration table that is described in the first example. Moreover, the travel control unit 92 reads out the delay time tc that is described in the second example. Then, the travel control unit 92 controls the driving force output device 28 and the braking device 30 so that the host vehicle 100 starts to travel at the suppressed acceleration axc at the timing after the normal timing, that is, at the time point T3 when the delay time tc has elapsed after the time point T1.

5. Modifications

The aforementioned embodiment can be modified variously such that a part of the functions is exchanged or another function is added. A part of modification is hereinafter described.

5.1 First Modification

Figure 6:
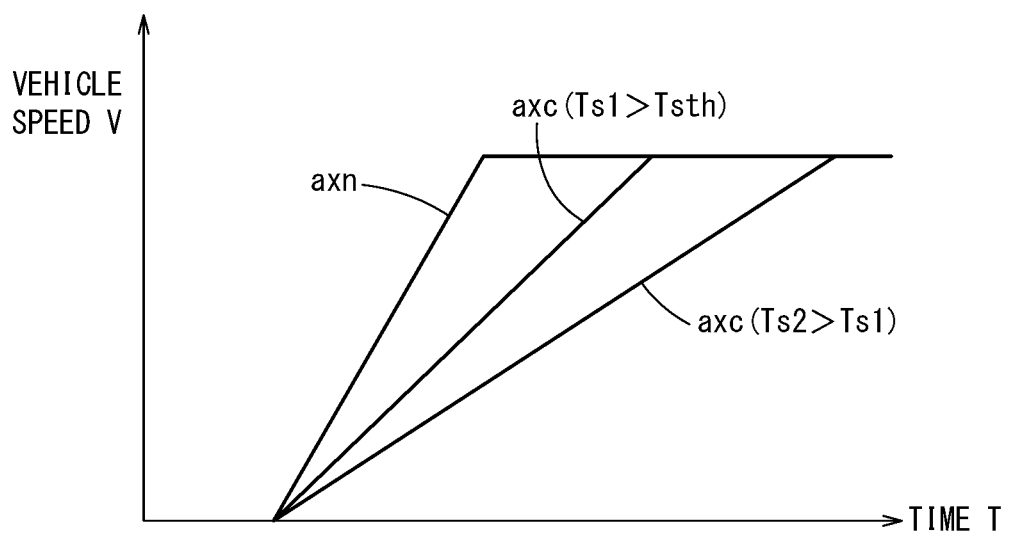
FIG. 6 is an explanatory diagram for describing acceleration in the start control.

As illustrated in FIG. 6, if the situation monitoring unit 94 detects the stop time Ts that is longer than the predetermined time Tsth, the travel control unit 92 may increase the suppressing amount of the acceleration axc more as the stop time Ts is longer. To increase the suppressing amount of the acceleration axc is to decrease the acceleration axc. For example, as the stop time Ts is longer, the travel control unit 92 may decrease the acceleration axc gradually. Alternatively, as the stop time Ts is longer, the travel control unit 92 may increase or decrease the rate of decrease of the acceleration axc. Further alternatively, the travel control unit 92 may keep the rate of decrease of the acceleration axc constant.

5.2 Second Modification

After the stop control and before the start control, the travel control unit 92 may cancel the start control in a case where the situation monitoring unit 94 detects the obstacle ahead of the host vehicle 100 that did not exist when the host vehicle 100 was stopped. "Ahead of the host vehicle 100" corresponds to the area that is sectioned by virtual lines extending forward from left and right ends of the host vehicle 100 along the travel lane 110 between the host vehicle 100 and the preceding vehicle 102. For example, after the host vehicle 100 stops in accordance with the stop of the preceding vehicle 102, the other vehicle 104 may cut into between the preceding vehicle 102 and the host vehicle 100. Alternatively, an object may drop ahead of the host vehicle 100. In these cases, the travel control unit 92 outputs the instruction information to keep the stop to the braking device 30, and cancel the start control. At this time, the notification control unit 90 outputs the instruction information to the HMI 34 (display 70, speaker 72). The HMI 34 notifies the vehicle occupant that the start control is canceled.

5.3 Third Modification

In the aforementioned embodiment, if the situation monitoring unit 94 has detected that the preceding vehicle 102 starts to travel (step S4 in FIG. 4: YES), the travel control unit 92 performs the start control. Meanwhile, as illustrated in FIG. 3B, if the other vehicle 104 exists, the travel control unit 92 may perform the start control in a case where the situation monitoring unit 94 has detected that the other vehicle 104 starts to travel or the distance between the host vehicle 100 and the other vehicle 104 becomes larger than or equal to a predetermined distance.

5.4 Fourth Modification

In the aforementioned embodiment, in step S1 in FIG. 4, it is determined whether the preceding vehicle 102 has stopped, and in step S4, it is determined whether the preceding vehicle 102 has started to travel. That is to say, in step S6, the situation monitoring unit 94 determines the change of the situation after the preceding vehicle 102 stops and before the preceding vehicle 102 starts to travel. Alternatively, in step S1 in FIG. 4, it may be determined whether the host vehicle 100 has stopped, and in step S4, it may be determined whether the host vehicle 100 has started to travel. That is to say, in step S6, the situation monitoring unit 94 may determine the change of the situation after the host vehicle 100 stops and before the host vehicle 100 starts to travel. Alternatively, the situation monitoring unit 94 may determine the change of the situation after the host vehicle 100 stops and before the preceding vehicle 102 starts to travel. Further alternatively, the situation monitoring unit 94 may determine the change of the situation after the preceding vehicle 102 stops and before the host vehicle 100 starts to travel.

5.5 Fifth Modification

Before the host vehicle 100 reaches the position where the preceding vehicle 102 stopped, the travel control unit 92 may perform the start control at the acceleration axc that is suppressed compared with the normal control amount. After the host vehicle 100 reaches the position where the preceding vehicle 102 stopped, the travel control unit 92 may perform the start control at the normal acceleration axn. In this case, the travel control unit 92 measures an inter-vehicle distance between the host vehicle 100 and the preceding vehicle 102 when these vehicles are stopped. The travel control unit 92 causes the host vehicle 100 to start to travel at the acceleration axc, and changes the acceleration to the acceleration axn when the host vehicle 100 has traveled by the inter-vehicle distance. At this time, the inter-vehicle distance may be corrected and the position of the preceding vehicle 102 may be set accurately.

5.6 Other Modifications

In the above description, the vehicle control device 10 is provided to the vehicle (host vehicle 100) that performs the start control in accordance with the start (detection thereof) of the preceding vehicle 102. Alternatively, the vehicle control device 10 may be provided to the vehicle (host vehicle 100) that performs the start control that is triggered by the vehicle occupant's operation of the operation elements.

In the aforementioned embodiment, in step S9 in FIG. 4, the travel control unit 92 performs the start control at the control amount that is suppressed compared with the normal control amount. Alternatively, the travel control unit 92 may cancel the start control.

6. Technical Concept Obtained from Embodiment

The technical concept that is obtained from the above embodiment and modifications is hereinafter described.

An aspect of the present invention is the vehicle control device 10 including the preceding vehicle recognition unit 96 configured to recognize the preceding vehicle 102 ahead of the host vehicle 100 and the behavior of the preceding vehicle 102; the travel control unit 92 configured to, if the preceding vehicle recognition unit 96 detects that the preceding vehicle 102 stops, perform the stop control of the host vehicle 100, and if the preceding vehicle recognition unit 96 detects that the preceding vehicle 102 starts to travel, perform the start control of the host vehicle 100; and the situation monitoring unit 94 configured to monitor the peripheral situation expressing the situation around the host vehicle 100 or the host vehicle situation expressing the situation of the host vehicle 100 itself, wherein after the preceding vehicle 102 stops and before the host vehicle 100 starts to travel, if the situation monitoring unit 94 does not detect the predetermined change of the peripheral situation or the host vehicle situation (step S6: YES, step S7: YES), the travel control unit 92 performs the start control at the normal control amount (acceleration axn, delay time tn), and if the situation monitoring unit 94 detects the predetermined change of the peripheral situation or the host vehicle situation (step S6: NO, step S7: NO), the travel control unit 92 performs the start control at the control amount (acceleration axc, delay time tc) that is suppressed compared with the normal control amount (acceleration axn, delay time tn) or cancel the start control.

In the above configuration, if the predetermined change of the peripheral situation or the host vehicle situation is not detected, the start control is performed at the normal control amount, and if the predetermined change of the peripheral situation or the host vehicle situation is detected, the start control is performed at the control amount that is suppressed compared with the normal control amount. Thus, the start control of the host vehicle 100 can be performed optimally. Alternatively, since the start control is canceled, the control of the host vehicle 100 can suit the peripheral situation.

In the above aspect, the vehicle control device 10 may further include the timer 66 configured to measure the stop time Ts of the host vehicle 100 or the preceding vehicle 102, wherein: the situation monitoring unit 94 may be configured to monitor the stop time Ts that is measured by the timer 66 as the peripheral situation or the host vehicle situation; and after the preceding vehicle 102 stops and before the host vehicle 100 starts to travel, if the situation monitoring unit 94 does not detect the stop time Ts that is longer than the predetermined time Tsth (step S7: YES), the travel control unit 92 may perform the start control at the normal acceleration axn, and if the situation monitoring unit 94 detects the stop time Ts that is longer than the predetermined time Tsth (step S7: NO), the travel control unit 92 may perform the start control at the acceleration axc that is suppressed compared with the normal acceleration axn.

As the stop time Ts of the host vehicle 100 and the preceding vehicle 102 is longer, the possibility that the peripheral situation changes is higher. For example, the possibility that the obstacle (for example, the other vehicle 104) appears between the host vehicle 100 and the preceding vehicle 102 is higher. In this case, it is preferable that the acceleration ax of the host vehicle 100 in the start be suppressed compared with that in the normal case. In the above configuration, if the stop time Ts is longer than the predetermined time Tsth, the start control is performed at the acceleration axc that is suppressed compared with the normal acceleration axn. Thus, the approach of the host vehicle 100 to the obstacle can be suppressed, so that the vehicle occupant can take the host vehicle 100 without anxiety.

In the above aspect, after the preceding vehicle 102 stops and before the host vehicle 100 starts to travel, if the situation monitoring unit 94 does not detect the predetermined change of the peripheral situation (step S6: YES, step S7: YES), the travel control unit 92 may perform the start control at the normal acceleration axn or the normal start timing (delay time tn), and if the situation monitoring unit 94 detects the predetermined change of the peripheral situation (step S6: NO, step S7: NO), the travel control unit 92 may perform the start control at the acceleration axc that is suppressed compared with the normal acceleration axn or the start timing (delay time tc) after the normal start timing (delay time tn).

In the above configuration, if the predetermined change of the peripheral situation or the host vehicle situation is not detected, the start control is performed at the normal acceleration axn or start timing, and if the predetermined change of the peripheral situation or the host vehicle situation is detected, the start control is performed at the acceleration axc or the start timing that is suppressed compared with that in the normal case. Thus, the start control of the host vehicle 100 can be performed optimally.

In the above aspect, if the stop time Ts is less than or equal to the predetermined time Tsth, the situation monitoring unit 94 resets the timer 66.

In the above aspect, if the situation monitoring unit 94 detects the stop time Ts that is longer than the predetermined time Tsth, the travel control unit 92 may increase the suppressing amount of the acceleration axc more as the stop time Ts is longer (First modification).

As the stop time Ts of the host vehicle 100 and the preceding vehicle 102 is longer, the possibility that the peripheral situation changes is higher. In the above configuration, as the stop time Ts is longer, the suppressing amount of the acceleration axc is larger. Thus, the approach of the host vehicle 100 to the obstacle can be suppressed more effectively, so that the vehicle occupant can take the host vehicle 100 without anxiety.

In addition, as the stop time Ts is longer, the possibility of the stop just after the start is higher. That is to say, the possibility that the start and the stop are repeated in a short time is high. In the above configuration, as the stop time Ts is longer, the suppressing amount of the acceleration axc is larger. Thus, the energy consumption in accordance with the unnecessary acceleration can be suppressed.

In the above aspect, after the preceding vehicle 102 stops and before the host vehicle 100 starts to travel, the travel control unit 92 may cancel the start control in the case where the situation monitoring unit 94 detects the obstacle ahead of the host vehicle 100 that did not exist when the host vehicle 100 was stopped (Second modification).

In the above configuration, if the obstacle is detected, the start control is canceled. Thus, the host vehicle 100 does not approach the obstacle in the start control. Therefore, the vehicle occupant can take the host vehicle 100 without anxiety.

In the above aspect, the travel control unit 92 may be configured to set the acceleration axc of the host vehicle 100 to be less than the acceleration ay of the preceding vehicle 102 that is recognized by the preceding vehicle recognition unit 96.

In the above configuration, it is possible to prevent the host vehicle 100 from approaching the preceding vehicle 102 in the start control. Thus, the vehicle occupant can take the host vehicle 100 without anxiety.

In the above aspect, the situation monitoring unit 94 may monitor the predetermined area A around the host vehicle 100 as the peripheral situation, and after the preceding vehicle 102 stops and before the host vehicle 100 starts to travel, if the situation monitoring unit 94 detects in the predetermined area A the other vehicle 104 that did not exist when the host vehicle 100 was stopped (step S6: NO), the travel control unit 92 may perform the start control at the acceleration axc that is suppressed compared with normal acceleration axn.

In the above configuration, it is possible to prevent the host vehicle 100 from approaching the other vehicle 104 in the start control. Thus, the vehicle occupant can take the host vehicle 100 without anxiety.

In the above aspect, the situation monitoring unit 94 may be configured to monitor the predetermined area A around the host vehicle 100 as the peripheral situation, and after the preceding vehicle 102 stops and before the host vehicle 100 starts to travel, if the situation monitoring unit 94 detects in the predetermined area A the other vehicle 104 that did not exist when the host vehicle 100 was stopped (step S6: NO), the travel control unit 92 may perform the start control at the start timing (delay time tc) after the normal start timing (delay time tn).

In the above configuration, it is possible to prevent the host vehicle 100 from approaching the other vehicle 104 in the start control. Thus, the vehicle occupant can take the host vehicle 100 without anxiety.

In the above aspect, the travel control unit 92 may perform the start control in the case where the situation monitoring unit 94 detects that the other vehicle 104 starts to travel or the distance between the host vehicle 100 and the other vehicle 104 becomes larger than or equal to the predetermined distance (Third modification).

In the above configuration, it is possible to prevent the host vehicle 100 from approaching the other vehicle 104 in the start control. Thus, the vehicle occupant can take the host vehicle 100 without anxiety.

In the above configuration, before the host vehicle 100 reaches the position where the preceding vehicle 102 stopped, the travel control unit 92 may perform the start control at the control amount that is suppressed compared with the normal control amount, and after the host vehicle 100 reaches the position where the preceding vehicle 102 stopped, the travel control unit 92 may perform the start control at the normal control amount.

In the above configuration, over the position where the preceding vehicle 102 stopped, the start control of the host vehicle 100 can be performed similarly to the start control of the preceding vehicle 102. As a result, the start control that is suppressed more than necessary is not performed. Thus, the host vehicle 100 can travel efficiently.

Note that the vehicle control device according to the present invention is not limited to the above embodiment, and can employ various configurations without departing from the concept of the present invention.

What is claimed is:

1. A vehicle control device comprising:
a preceding vehicle recognition unit configured to recognize a preceding vehicle ahead of a host vehicle and behavior of the preceding vehicle;
a travel control unit configured to, if the preceding vehicle recognition unit detects that the preceding vehicle stops, perform stop control of the host vehicle, and if the preceding vehicle recognition unit detects that the preceding vehicle starts to travel, perform start control of the host vehicle; and
a situation monitoring unit configured to monitor a peripheral situation expressing a situation around the host vehicle or a host vehicle situation expressing a situation of the host vehicle itself,
wherein the situation monitoring unit monitors an area ahead of the host vehicle as the peripheral situation; and
after the preceding vehicle stops and before the host vehicle starts to travel, if the situation monitoring unit does not detect an obstacle or another vehicle that did not exist ahead of the host vehicle when the host vehicle was stopped, the travel control unit performs the start control at a normal acceleration, and if the situation monitoring unit detects an obstacle or another vehicle that did not exist ahead of the host vehicle when the host vehicle was stopped, the travel control unit performs the start control at an acceleration that is lower than the normal acceleration or cancel the start control.

2. The vehicle control device according to claim 1, wherein after the preceding vehicle stops and before the host vehicle starts to travel, if the situation monitoring unit does not detect the obstacle or the another vehicle that did not exist ahead of the host vehicle when the host vehicle was stopped, the travel control unit performs the start control at the normal acceleration and a normal start timing, and if the situation monitoring unit detects the obstacle or the another vehicle that did not exist ahead of the host vehicle when the host vehicle was stopped, the travel control unit performs the start control at an acceleration that is lower than the normal acceleration and a start timing after the normal start timing.

3. The vehicle control device according to claim 1, wherein:
after the preceding vehicle stops and before the host vehicle starts to travel, if the situation monitoring unit detects the another vehicle, the travel control unit performs the start control at the acceleration that is lower than the normal acceleration.

4. The vehicle control device according to claim 3, wherein the travel control unit performs the start control in a case where the situation monitoring unit detects that the other vehicle starts to travel or a distance between the host vehicle and the other vehicle becomes larger than or equal to a predetermined distance.

5. The vehicle control device according to claim 1, wherein:
after the preceding vehicle stops and before the host vehicle starts to travel, if the situation monitoring unit detects the another vehicle, the travel control unit performs the start control at the acceleration that is lower than the normal acceleration and at the start timing after the normal start timing.

6. A vehicle control device comprising:
a preceding vehicle recognition unit configured to recognize a preceding vehicle ahead of a host vehicle and behavior of the preceding vehicle;
a travel control unit configured to, if the preceding vehicle recognition unit detects that the preceding vehicle stops, perform stop control of the host vehicle, and if the preceding vehicle recognition unit detects that the preceding vehicle starts to travel, perform start control of the host vehicle;
a situation monitoring unit configured to monitor a peripheral situation expressing a situation around the host vehicle or a host vehicle situation expressing a situation of the host vehicle itself; and a timer configured to measure stop time of the host vehicle or the preceding vehicle, wherein:

the situation monitoring unit is configured to monitor the stop time that is measured by the timer as the peripheral situation or the host vehicle situation; and after the preceding vehicle stops and before the host vehicle starts to travel, if the situation monitoring unit does not detect the stop time that is longer than predetermined time, the travel control unit performs the start control at a normal acceleration, and if the situation monitoring unit detects the stop time that is longer than the predetermined time, the travel control unit performs the start control at an acceleration that is lower than the normal acceleration, and the longer the stop time, the lower the acceleration.

7. The vehicle control device according to claim 6, wherein if the stop time is less than or equal to the predetermined time, the situation monitoring unit resets the timer.

8. The vehicle control device according to claim 6, wherein the situation monitoring unit monitors an area ahead of the host vehicle as the peripheral situation; and after the preceding vehicle stops and before the host vehicle starts to travel, the travel control unit cancels the start control in a case where the situation monitoring unit detects an obstacle ahead of the host vehicle that did not exist when the host vehicle was stopped.

9. The vehicle control device according to claim 6, wherein the travel control unit is configured to set the acceleration of the host vehicle to be less than an acceleration of the preceding vehicle that is recognized by the preceding vehicle recognition unit.

10. A vehicle control device comprising:

a preceding vehicle recognition unit configured to recognize a preceding vehicle ahead of a host vehicle and behavior of the preceding vehicle;

a travel control unit configured to, if the preceding vehicle recognition unit detects that the preceding vehicle stops, perform stop control of the host vehicle, and if the preceding vehicle recognition unit detects that the preceding vehicle starts to travel, perform start control of the host vehicle; and a situation monitoring unit configured to monitor a peripheral situation expressing a situation around the host vehicle or a host vehicle situation expressing a situation of the host vehicle itself, wherein after the preceding vehicle stops and before the host vehicle starts to travel, if the situation monitoring unit does not detect a predetermined change of the peripheral situation or the host vehicle situation, the travel control unit performs the start control at a normal control amount, and if the situation monitoring unit detects the predetermined change of the peripheral situation or the host vehicle situation, the travel control unit performs the start control at a control amount that is suppressed compared with the normal control amount or cancel the start control, and wherein before the host vehicle reaches a position where the preceding vehicle stopped, the travel control unit performs the start control at the control amount that is suppressed compared with the normal control amount, and after the host vehicle reaches the position where the preceding vehicle stopped, the travel control unit performs the start control at the normal control amount.

* * * * *